(12) United States Patent
Kröger et al.

(10) Patent No.: US 7,603,906 B2
(45) Date of Patent: Oct. 20, 2009

(54) PIEZOELECTRIC SENSOR

(75) Inventors: Dietmar Kröger, Graz (AT); Michael Hirschler, Graz (AT); Alexander Friedl, Graz (AT); Alexander Schricker, Graz (AT); Ferdinand Krispel, Wundschuh (AT); Wolfgang Michelitsch, Graz (AT)

(73) Assignee: Piezocryst Advanced Sensorics GmbH, Graz (AT)

( * ) Notice: Subject to any disclaimer, the term of this patent is extended or adjusted under 35 U.S.C. 154(b) by 0 days.

(21) Appl. No.: 11/806,918

(22) Filed: Jun. 5, 2007

(65) Prior Publication Data

US 2007/0277618 A1  Dec. 6, 2007

(30) Foreign Application Priority Data

Jun. 6, 2006  (AT)  ................ A 971/2006

(51) Int. Cl.
  *G01L 7/00*  (2006.01)
(52) U.S. Cl. ........................................ 73/714
(58) Field of Classification Search ............... 73/714
  See application file for complete search history.

(56) References Cited

U.S. PATENT DOCUMENTS

| 2003/0098632 | A1 | 5/2003 | Takeuchi et al. |
| 2005/0099096 | A1 | 5/2005 | Baumgartner et al. |
| 2007/0199376 | A1 | 8/2007 | Cavalloni et al. |

FOREIGN PATENT DOCUMENTS

| EP | 1283552 | 2/2003 |
| GB | 2022261 | 12/1979 |
| GB | 1052230 | 12/1996 |
| WO | 9016087 | 12/1990 |
| WO | 2005026678 | 3/2005 |

OTHER PUBLICATIONS

English Abstract of EP 1283552.

*Primary Examiner*—Andre J Allen
(74) *Attorney, Agent, or Firm*—Dykema Gossett PLLC

(57) ABSTRACT

A piezoelectric sensor, preferably a pressure sensor, comprising at least two piezoelectric measuring elements placed in a housing, which are clamped between a membrane on the pressured side of the housing and a pick-up electrode electrically insulated against the housing. The piezoelectric measuring elements are fixedly attached to the pick-up electrode by thermo-compression or soldering and together with said pick-up electrode form a compact measuring element stack, which will significantly simplify assembly of the piezoelectric sensor.

13 Claims, 4 Drawing Sheets

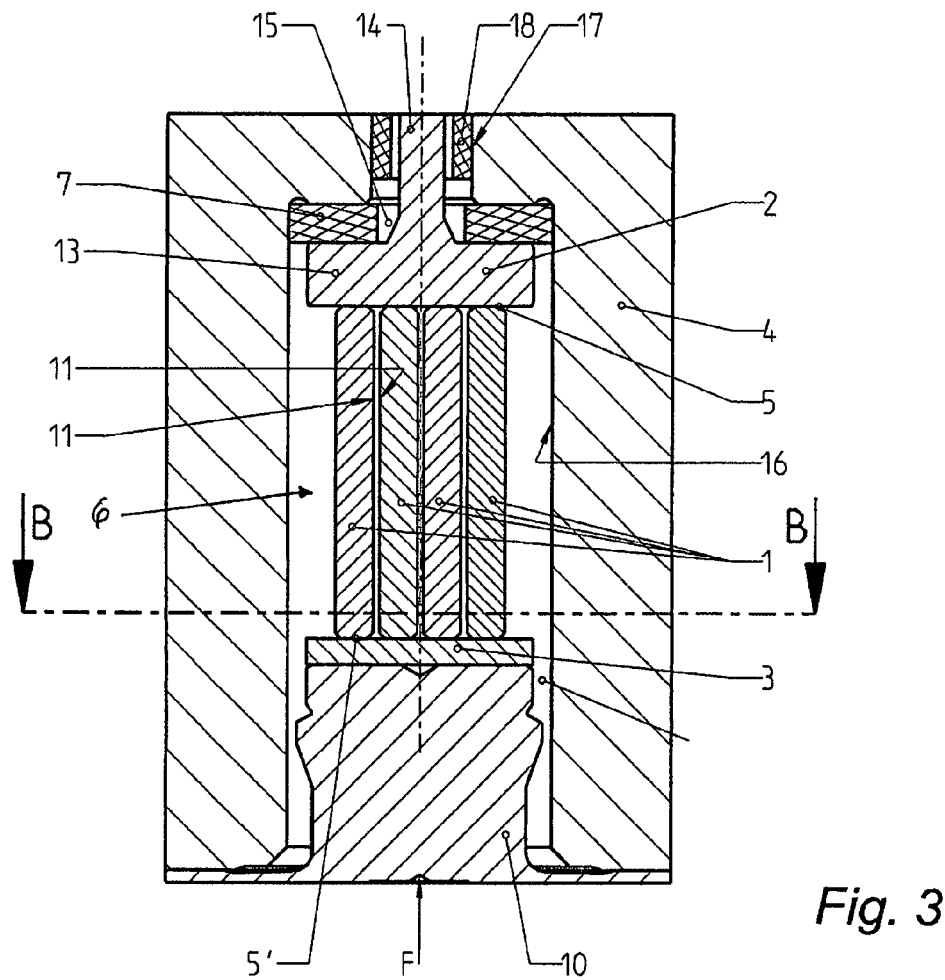
Fig. 3
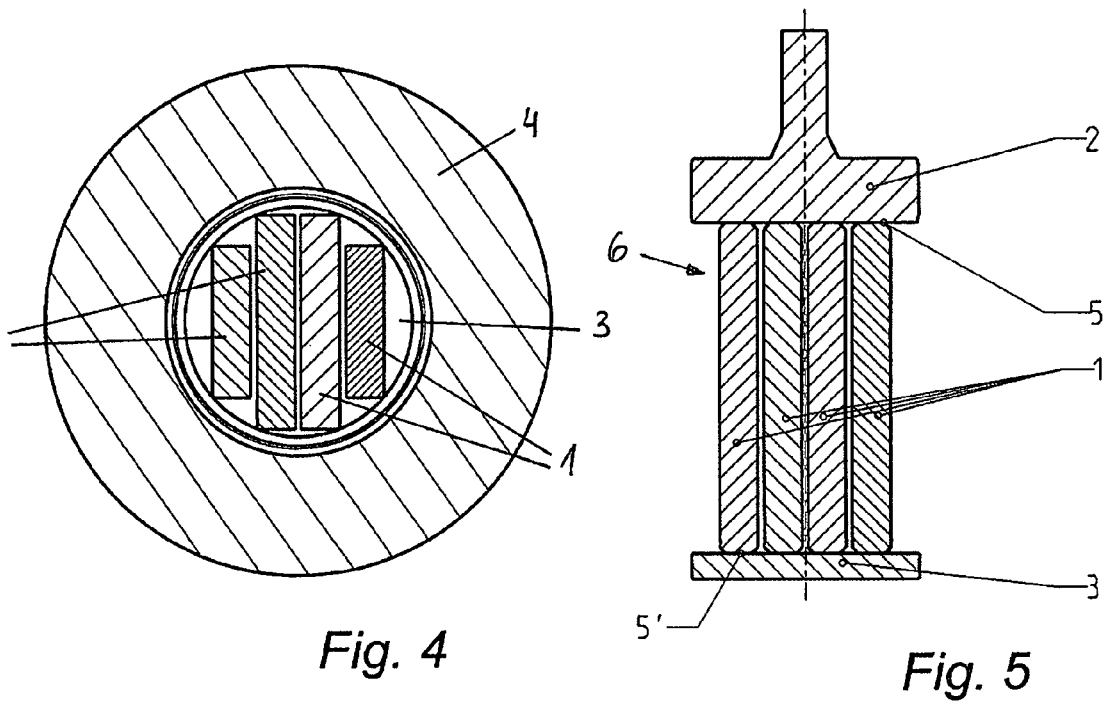
Fig. 4
Fig. 5

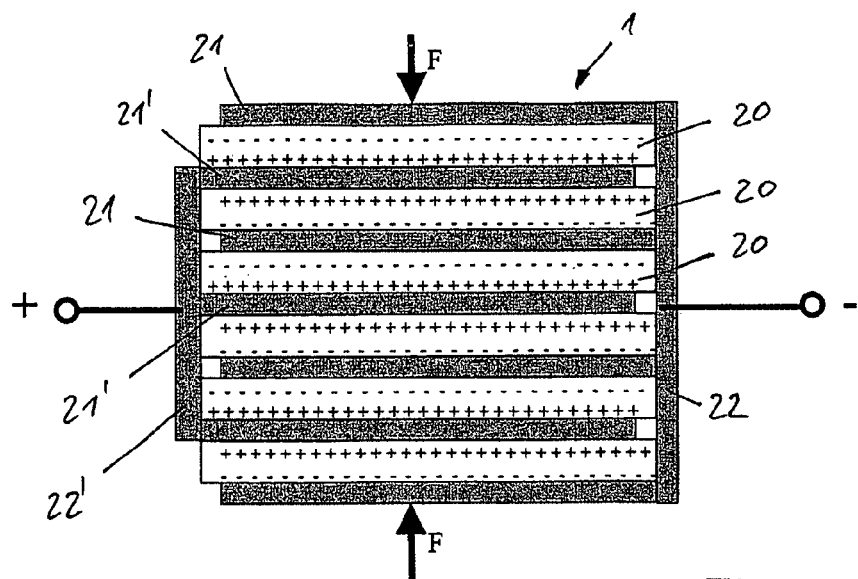
*Fig. 8*
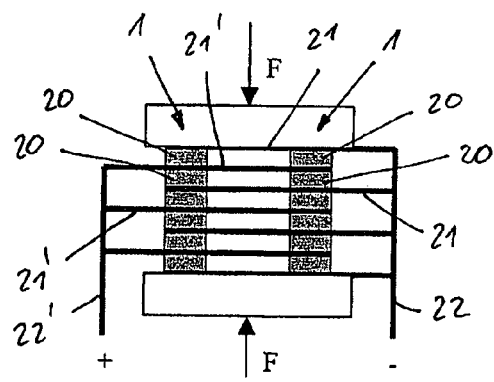
*Fig. 9*
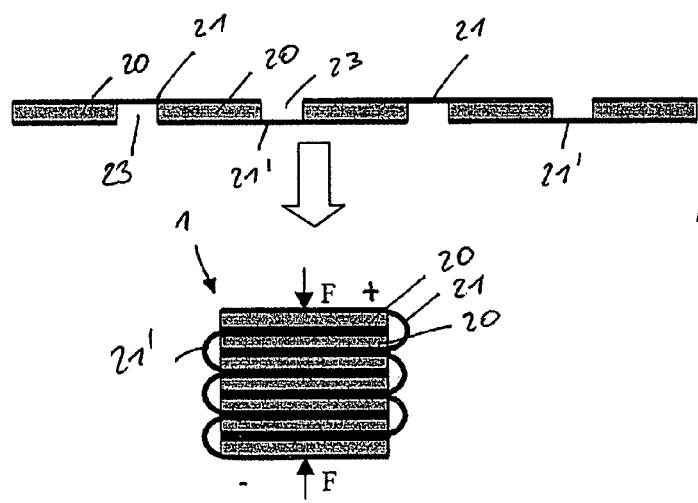
*Fig. 10*
*Fig. 11*

PIEZOELECTRIC SENSOR

BACKGROUND OF THE INVENTION

1 Field of the Invention

The invention relates to a piezoelectric sensor, preferably a pressure sensor, with at least two piezoelectric measuring elements placed in a housing, which are clamped between a membrane on the pressured side of the housing and a pick-up electrode which is electrically insulated against the housing.

2 The Prior Art

Piezoelectric measuring elements serve for measuring forces, pressures, acceleration, strain and moments, for instance, and are used in sensors which are optimized for the application desired. If the transversal piezoeffect is employed measuring elements consisting of thin plates or rods are used, the force or pressure to be measured being applied via the top faces or narrow sides. Since the sensitivity of the piezoelectric measuring element is proportional to the ratio between the area of the face on which charge is accumulated (side face) and the pressured area (narrow side), the crystal elements are relatively thin, and thus a number of such crystal lamellas are used parallel to each other in order to sustain the required pressure and to enhance sensitivity. This makes handling, in particular positioning and aligning, of the individual measuring elements rather complicated. Centering means are therefore often provided in the sensors, which are designed to hold the crystal elements in position. It is for instance known to position lamella-shaped measuring elements relative to each other by means of spacer sheets, these spacer sheets being formed in such a way that they act as springs on the crystal elements, pressing them against the inside wall of the housing, which is covered with electrically insulating plastic material. In the instance of certain pressure sensors which are inserted in indicator bores, the sensor housing has an interior diameter of about 2 mm only, leading to very small structures and thus to increased handling difficulties in manufacturing.

A further disadvantage inherent in the use of plastic positioning means is due to their increasing conductivity at high temperatures, which may cause the sensor to fail. The plastic material undergoes irreversible changes at very high temperatures (400° C.), leading to a substantial increase in conductivity and thus to electrical short circuits.

In this context a multilayer piezoelectric measuring element has become known from WO 2005/026678 A, which may be used in a pressure or force sensor. The sensor described in this document has at least two piezoelectric crystal elements placed directly side by side, and employ the transversal piezoelectric effect. The crystal elements are lamella-shaped and have a thickness of less than 0.5 mm. The individual crystal elements are serially arranged with alternating polarity and are rigidly bound together via their electrode layers by means of bonding, soldering or thermo-compression. The advantage of such a stack of bonded crystal elements lies on the one hand in its high sensitivity and stability under load. On the other hands introducing the stack into a sensor is at least partly simplified, since the whole stack, and not each single crystal element, is positioned accordingly and electrically insulated from the interior wall of the sensor housing.

From EP 1 283 552 A2 there is known a piezoelectric crystal with transversal effect which can be built into a sensor without centering and without the use of further assembly means. To this end, the piezoelectric crystal is furnished with a one-part base with individual round segments, which can be inserted into a bore of a holding part of the sensor. Furthermore, a variant is described in EP 1 283 552 A2, in which two mirror-symmetrical crystals are arranged side by side, resulting in doubled sensitivity of the sensor. Both the simple crystal with its base and the double crystal with a divided base made up of two mirror halves, are relatively complicated to manufacture, and the remaining handling effort for assembling the sensor is still considerable.

From GB 2 022 261 A there is known a piezoelectric pressure sensor with a two-part housing, which has a pestle-shaped pick-up electrode electrically insulated against the upper part of the housing, and where the single piezoelectric measuring element is glued to the pick-up electrode with its back and to a pressure plate with its front. When the pressure sensor is assembled and ready for use, the glue will inhibit movement between the measuring element and the contact face of the electrode; the possibility of such movement is required for stable measuring properties and is necessary to avoid destruction of the measuring element at high temperatures due to differing thermal expansion coefficients of the measuring element and the pick-up electrode. Glueing, as described in document GB 2 022 261 A, has further disadvantages, since at higher temperatures the insulation properties will deteriorate due to evaporating residual glue.

SUMMARY OF THE INVENTION

It is the object of the present invention to improve a piezoelectric sensor, for instance a pressure sensor, with a plurality of piezoelectric measuring elements in such a way that positioning of the measuring elements will be further simplified while sufficient electrical insulation of the measuring elements from the interior wall of the housing—especially at high temperatures—will be ensured.

This object will be achieved by the invention by providing that the piezoelectric measuring elements are attached to the pick-up electrode by thermo-compression or soldering, thus forming a compact stack together with the pick-up electrode. Attaching the individual measuring elements to the pick-up electrode can be carried out externally of the sensor or the sensor housing, and thus slipping or sliding of the measuring elements during assembly of the sensor will be avoided. In the completed sensor movement between the measuring elements and the contact face of the electrode due to differing thermal expansion coefficients will still be possible, since at higher temperatures the ductile layers or the solder between measuring elements and pick-up electrodes will soften and will thus permit a slight sliding motion between measuring elements and the contact points.

In a first variant of the invention the piezoelectric measuring elements are preferably lamella-shaped, and are attached to the pick-up electrode with the narrow side by thermo-compression or soldering to make use of the transversal piezoeffect. To enhance movability at high temperature loads the stacked piezoelectric measuring elements can be provided with an air gap between adjacent side faces.

In an advantageous variant of the invention the piezoelectric measuring elements may be attached with one narrow side to the pick-up electrode insulated against the housing and with the opposing narrow side to a pick-up electrode located next to the membrane, by means of thermo-compression or soldering; the stack of measuring elements is thus being held by pick-up electrodes on both narrow sides of the piezoelectric measuring elements and can be inserted into the sensor housing as one compact unit.

In this context it is of advantage if the pick-up electrode insulated against the housing essentially consists of a disk-shaped contact element and a pin-shaped lead element, where the piezoelectric measuring elements are attached to the contact element, which rests against the housing with an insulating element being interposed, and where the pin-shaped lead element passes through an opening of the insulating element. Exact positioning of the measuring element can be carried out by means of the pin-shaped lead element.

According to a second advantageous variant of the invention the piezoelectric measuring elements may preferably be lamella-shaped and may be attached with a side face to the pick-up electrode by bonding, soldering or thermo-compression, thus making use of the longitudinal piezoelectric effect. The pick-up electrode may for instance be disk-shaped with two piezoelectric measuring elements of alternate polarisation being placed on opposite sides of the disk-shaped pick-up electrode.

BRIEF DESCRIPTION OF THE DRAWINGS

The invention will now be explained in more detail, with reference to the enclosed drawings. There is shown in:

FIG. 3 a first variant of a sensor according to the invention in a sectional view as in FIG. 1;
FIG. 4 a section along line B-B of FIG. 3;
FIG. 5 a detail of FIG. 3;
FIG. 8 a measuring element of a pressure sensor according to the invention made by multilayer technology;
FIG. 9 a variant of the measuring element of FIG. 8;
FIGS. 10 and 11 a further variant of a measuring element of the pressure sensor in two phases of its manufacture.

DETAILED DESCRIPTION OF THE PREFERRED EMBODIMENTS

Figure 1:
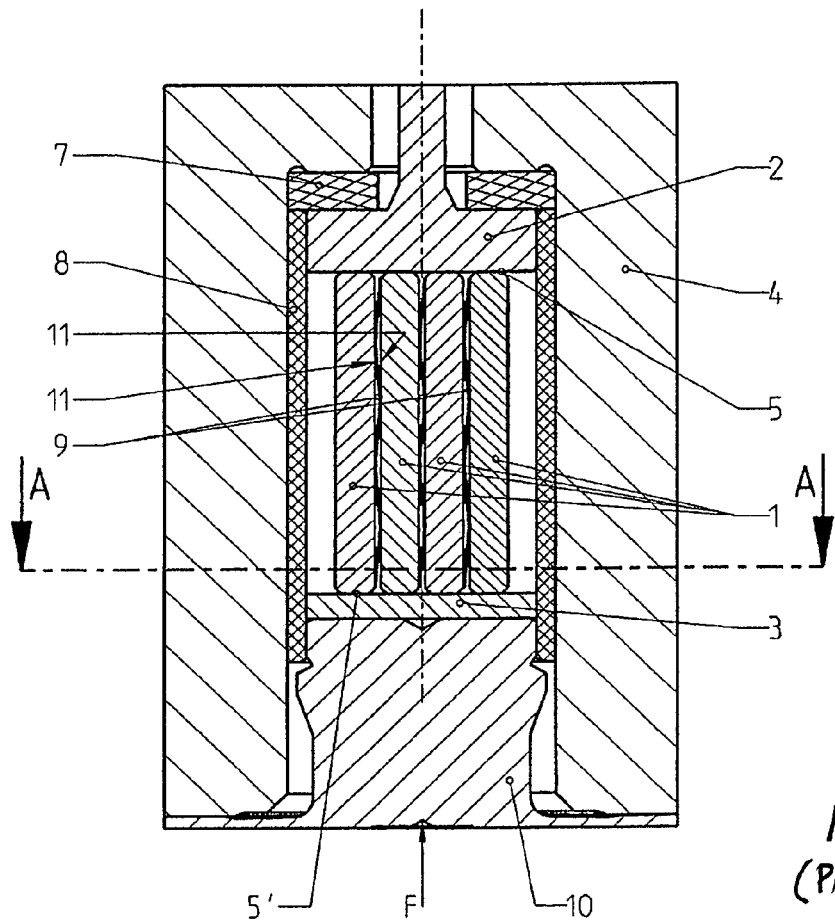
FIG. 1 a state-of-the-art piezoelectric pressure sensor in axial section.
Figure 2:
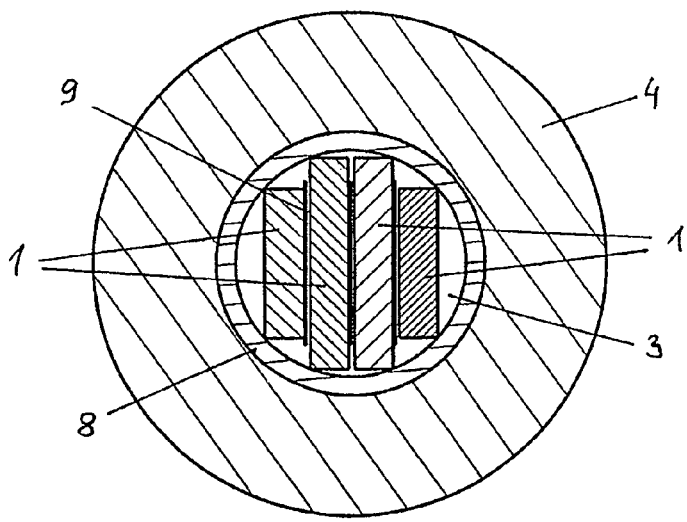
FIG. 2 a section along line A-A of FIG. 1.

The state-of-the-art piezoelectric pressure sensor shown in FIGS. 1 and 2 has four lamella-shaped piezoelectric measuring elements 1 making use of the transversal piezoeffect, which are clamped between a pick-up electrode 2, which is electrically insulated against the housing 4, and a pick-up electrode 3, which is at the potential of the housing. The individual measuring elements 1 are in contact with the pick-up electrodes 2, 3 via their narrow sides 5, 5', with the pick-up electrode 3 directly adjacent to a membrane 10 located at the pressured side of the housing 4. Force is being applied to the pressure sensor parallel to its axis (indicated by arrow F). In order to position the individual measuring elements 1 relative to each other, spacer sheets 9 are placed between adjacent side faces 11, which spacer sheets 9 may be corrugated to provide a spring effect pressing the individual crystal elements 1 against the interior wall of the housing 4. A coating layer 8 of insulating plastic material is provided between the measuring elements 1 and the housing 4 to avoid insulation loss. An insulating element 7 for the pick-up electrode 2 is provided between the pick-up electrode 2 and the housing 4.

The individual elements of the sensor must be positioned individually and with care, which requires great manipulative effort if the interior diameter of the sensor is small (up to 2 mm).

In the various embodiments of the invention described below identical or corresponding parts have the same reference numbers.

In the first variant of the invention shown in FIGS. 3 to 5 the piezoelectric measuring elements 1 are attached to the pick-up electrode 2 by thermo-compression or soldering with their narrow sides 5 and thus form a compact measuring element stack 6, which can be inserted into the housing 4 with the help of the pick-up electrode 2 and which can be centered without the use of centering means remaining in the housing 4 in such a way that a sufficient air gap is provided between the interior wall of the sensor housing 4 and the individual measuring elements 1. The stack 6 of measuring elements as shown in FIG. 5 may either consist of the pick-up electrode 2 with the attached measuring elements 1 or may additionally be provided with a pick-up electrode 3 on the opposite side, which is attached to the opposite narrow sides 5' of the measuring elements 1 by thermo-compression or soldering. The piezoelectric measuring elements 1 and/or the pick-up electrodes 2, 3 are provided with a ductile coating on their contact sites (i.e., in the area of the narrow sides 5 and 5' of the measuring elements 1), which preferably is applied by sputtering.

The ductile coating may for instance consist of gold, a gold alloy or a solder containing silver. If the measuring elements 1 have thin electrode coatings of gold on their side faces 11 and narrow sides 5, 5', it is only necessary to coat the contact sites of the pick-up electrodes 2, 3 with gold in order to attach the measuring elements 1 to the pick-up electrodes 2, 3 by means of thermo-compression.

The pick-up electrode 2 essentially consists of a disk-shaped contact element 13 and a pin-shaped lead element 14, the piezoelectric measuring elements 1 being attached to the contact element 13, which rests against the housing 4 with an insulating element 7 being interposed. The pin-shaped lead element 14 passes through an opening 15 of the insulating element 7. According to a variant of the invention the pick-up electrode 2 insulated against the housing 4 may essentially be a disk with an aperture and a pin-shaped lead element 14 which is inserted into the aperture from above.

The fixed attachment of the measuring elements 1 as proposed by the invention must ensure reliable assembly, but should also permit movement between the measuring elements 1 and their contact faces at the pick-up electrodes 2, 3 in the assembled, ready-for-use sensor, in order to keep their measuring properties intact and to avoid destruction of the measuring elements 1 at high temperature loads due to differing thermal expansion coefficients of the measuring elements 1 and the pick-up electrodes 2, 3.

Assembly is carried out as follows:

the measuring elements 1 are coated with a ductile layer on their narrow sides 5, 5' by means of a sputtering process;
preferably the pick-up electrodes 2, 3 are also coated by sputtering at least on the contact faces for the measuring elements 1;
the measuring elements 1 and the pick-up electrodes 2, 3 are aligned relative to each other and fixedly attached outside the pressure sensor. Using a compression force which does not damage the crystal elements 1, and increased temperature, the parts 1 to 3 are fixed and mutually attached by thermo-compression or soldering;
the resulting measuring element stack 6 is introduced into the interior space 16 of the sensor housing 4 as a single unit and can be aligned by means of a centering device 18, which may be removed later on (for instance after the membrane 10 has been mounted) and may be located between the pin-shaped lead element 14 and a bore 17 in the sensor housing 4, the alignment being such that an air gap is provided between the measuring elements 1 and the interior wall of the housing 4, which ensures the necessary insulation;
for accurate positioning of the measuring element stack 6 a conical transition surface between the contact element 13 and the lead element 14 in cooperation with the bore 15 in the insulating element 7 may be used.

Figure 6:
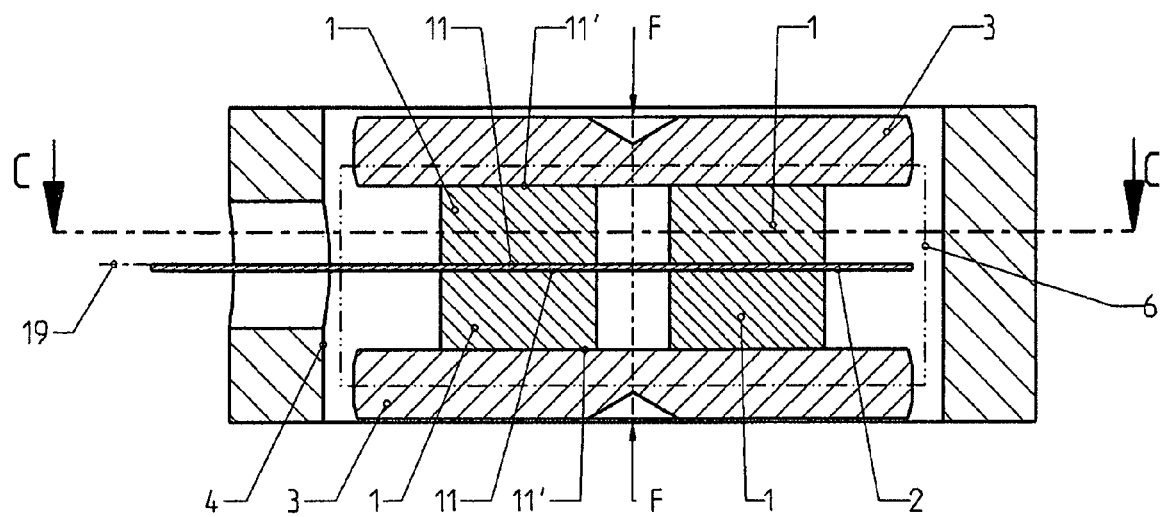
FIG. 6 a second variant of a sensor according to the invention in axial section.
Figure 7:
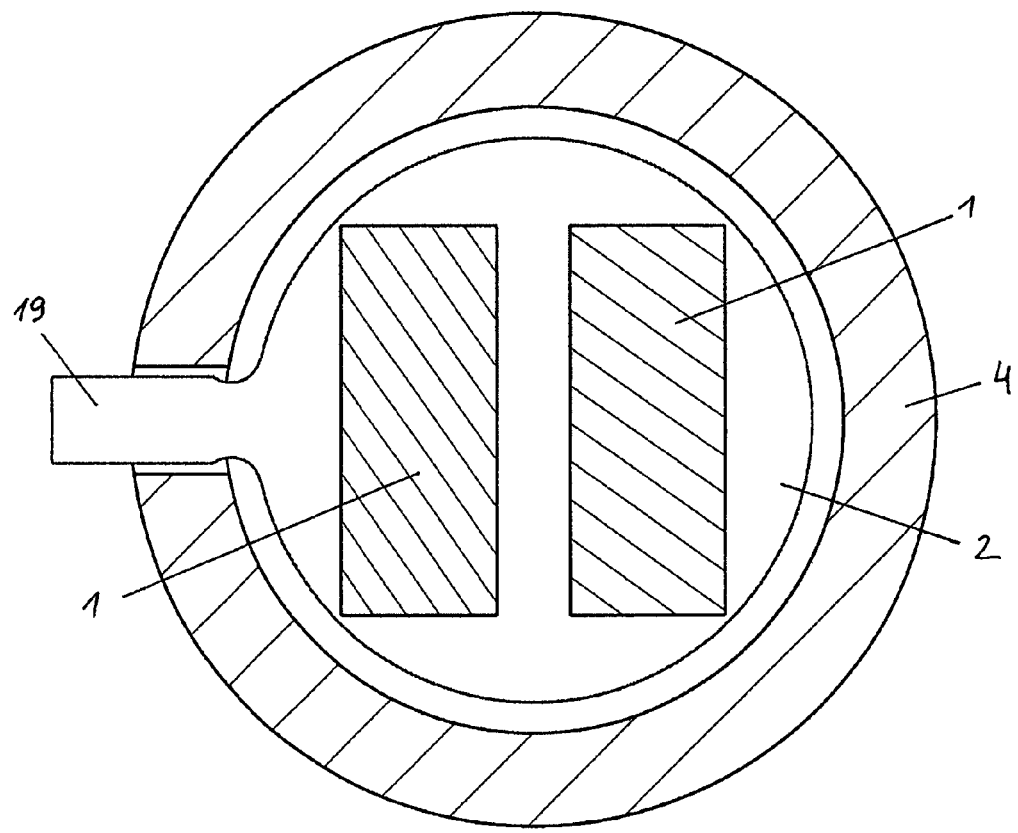
FIG. 7 a section along line C-C of FIG. 6.

In the second variant of the invention shown in FIGS. 6 and 7 the piezoelectric measuring elements 1 are attached to the pick-up electrode 2 with a side face 11 each by thermo-compression or soldering, thus making use of the longitudinal piezoeffect. The pick-up electrode 2 with the signal lead 19 may essentially be disk-shaped, with two piezoelectric measuring elements 1 of opposite polarization being placed on opposite sides of the disk-shaped pick-up electrode 2. The disk-shaped pick-up electrode 2 with the attached piezo-electric measuring elements 1 forms a measuring element stack 6 which is easily handled. The pick-up electrode 2 need not necessarily be circular but could also have other shapes (e.g., square or rectangular).

The measuring element stack 6 may additionally comprise one or both pick-up electrodes 3, the measuring elements 1 being attached with their side faces 11' to the pick-up electrodes 3 by thermo-compression or soldering. One or both of the pick-up electrodes 3 are adjacent to a membrane not shown in the drawings, which is welded to the housing 4. The piezoelectric measuring elements 1 and/or the pick-up electrodes 2, 3 are provided with a ductile coating (for instance gold or a solder containing silver) at their contact sites in the area of the side faces 11, 11'.

In both variants the pick-up electrode 2 may be made of metal, a metal alloy, an electrically conductive ceramic material or a ceramic material with a conductive coating. For high-temperature measurements the piezoelectric measuring elements 1 may be made of high-temperature-resistant material, preferably $GaPO_4$.

According to an advantageous variant of the invention the piezoelectric measuring elements 1 shown in the diverse variants may be configured as multilayer elements consisting of thin piezoelectric layers 20 alternating with thin electrode layers 21 (see FIGS. 8 to 11). Such "thin film stacks" may be manufactured in various ways.

Due to the layered configuration the piezoeffect (for single crystals 1-10 pm/V) is increased for application in pressure sensors, and at the same time other advantages of piezoelectric single crystals may be exploited (low dielectric loss, temperature-stable constants, etc.)

FIG. 8 shows the layered configuration of a piezostack. Since the piezoelectric constant is predetermined by the single crystal, the piezoelectric layers 20 must be oriented in such a way that charge pick-up by the electrode layers 21, 21' will be possible. Lateral electrode layers 22, 22' connect layers with charges having the same sign.

The multilayer configuration will multiply the effective area and addition of the charges will result in a substantially increased piezoeffect as compared with single elements (e.g. six-fold in the variant of FIG. 8).

Construction of the Layers

According to a simple variant the piezoelectric plates or layers 20 are separated by metal foils acting as electrode layers 21, 21', and are stacked one above the other with opposite orientation. The conductive edges, which are electrically of opposite polarity, may be slightly milled before the lateral contacts are applied. The lateral electrodes 22, 22' may be applied by means of known techniques.

In another variant the electrode layers 21, 21' may be directly applied on the piezoelectric layers 20 (for instance by sputtering or evaporation techniques).

In FIG. 9 two piezoelectric measuring elements 1 are combined into a multistack. The individual elements 20 must be manufactured first, then they are aligned (with alternating polarity) and welded under pressure with the metal foils 21, 21'.

Very Thin Layers

Piezostacks with very thin piezoelectric layers 21, 21' are particularly effective. A very advantageous way of manufacturing such stacks is the folding technique as shown in FIGS. 10 and 11. The piezoelectric single crystal layer 20 may for instance be applied on the electrode layer 21' by epitaxial growth and then covered with an electrode layer 20 (FIG. 20). The required gaps 23 in the individual layers may be made by sputtering or etching processes. The structure is then folded as shown in FIG. 10, resulting in a thin film stack according to FIG. 11.

In all these processes the piezoelectric layer 20 must be oriented (for instance by introducing an oriented structure into the metallic substrate, or by means of an electric field or of mechanical pressure during growth). Epitaxial methods include atomic growth (such as CVD, PVD) or direct, oriented growth (liquid-phase epitaxy, flux growth, etc.)

What is claimed is:

1. A piezoelectric sensor comprising at least two piezoelectric measuring elements located in a housing and which are clamped between a membrane on a pressured side of the housing and a pick-up electrode electrically insulated against the housing,
    wherein the piezoelectric measuring elements are lamella-shaped having adjacent side faces and narrow sides and, in order to make use of transversal piezoeffect, are each attached with one of the narrow sides to the pick-up electrode by thermo-compression or soldering to form a compact measuring element stack together with said pick-up electrode, and
    wherein the piezoelectric measuring elements are stacked and are positioned to define an air gap between adjacent side faces.

2. The piezoelectric sensor according to claim 1, wherein the piezoelectric measuring elements are each attached by thermo-compression or soldering with one narrow side to the pick-up electrode insulated against the housing, and with an opposite narrow side to a pick-up electrode located next to the membrane.

3. The piezoelectric sensor according to claim 1, wherein at least one of the piezoelectric measuring elements and the pick-up electrodes include a ductile coating on their contact sites.

4. The piezoelectric sensor according to claim 1, wherein the pick-up electrode comprises metal, metal alloy, conductive ceramic material or ceramic material with an electrically conductive coating.

5. The piezoelectric sensor according to claim 1, wherein the piezoelectric measuring elements comprise a high-temperature resistant material.

6. The piezoelectric sensor according to claim 5, wherein said high-temperature material is $GaPO_4$.

7. The piezoelectric sensor according to claim 1, wherein the piezoelectric measuring elements are multi-layered and comprise thin, piezoelectric layers alternating with thin electrode layers.

8. The piezoelectric sensor according to claim 1, wherein the sensor is a pressure sensor.

9. A piezoelectric sensor comprising at least two piezoelectric measuring elements located in a housing and which are clamped between a membrane on a pressured side of the housing and a pick-up electrode electrically insulated against the housing, wherein the piezoelectric measuring elements are lamella-shaped having side faces and, in order to making use of longitudinal piezoeffect, are each fixedly attached with a side face to the pick-up electrode by thermo-compression or soldering to form a compact measuring element stack together with said pick-up electrode, and wherein the pick-up electrode is disk-shaped and two piezoelectric measuring elements are attached to opposite sides of the disk-shaped pick-up electrode.

10. The piezoelectric sensor according to claim 9, wherein at least one of the piezoelectric measuring elements and the pick-up electrodes include a ductile coating on their contact sites.

11. The piezoelectric sensor according to claim 9, wherein the pick-up electrode comprises metal, metal alloy, conductive ceramic material or ceramic material with an electrically conductive coating.

12. The piezoelectric sensor according to claim 9, wherein the piezoelectric measuring elements are multi-layered and comprise thin, piezoelectric layers alternating with thin electrode layers.

13. The piezoelectric sensor according to claim 9, wherein the sensor is a pressure sensor.

* * * * *